(12) United States Patent
Sugaya

(10) Patent No.: US 10,359,667 B2
(45) Date of Patent: Jul. 23, 2019

(54) BACKLIGHT UNIT AND LIQUID CRYSTAL DISPLAY DEVICE

(71) Applicant: NLT Technologies, Ltd., Kawasaki, Kanagawa (JP)

(72) Inventor: Hiroki Sugaya, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 301 days.

(21) Appl. No.: 14/619,089

(22) Filed: Feb. 11, 2015

(65) Prior Publication Data

US 2015/0230310 A1    Aug. 13, 2015

(30) Foreign Application Priority Data

Feb. 13, 2014  (JP) .................................. 2014-025153
Sep. 2, 2014   (JP) .................................. 2014-177793

(51) Int. Cl.
    *G09G 3/36*      (2006.01)
    *G02F 1/1335*    (2006.01)
    (Continued)

(52) U.S. Cl.
    CPC .. *G02F 1/133603* (2013.01); *G02F 1/133609* (2013.01); *G09G 3/3413* (2013.01);
    (Continued)

(58) Field of Classification Search
    CPC ......... G02F 1/133514; G02F 1/133603; G02F 1/336; G02F 2001/133622;
    (Continued)

(56) References Cited

U.S. PATENT DOCUMENTS

2006/0066266 A1   3/2006  Li Lim et al.
2008/0002101 A1*  1/2008  Akiyama ............. G02B 6/0068
                                                          349/65
(Continued)

FOREIGN PATENT DOCUMENTS

JP   2004-029141   1/2004
JP   2007-123153   5/2007
(Continued)

OTHER PUBLICATIONS

Japanese Office Action for Application No. 2014-177793, dated May 15, 2018, with English translation.

*Primary Examiner* — Amr A Awad
*Assistant Examiner* — Aaron Midkiff
(74) *Attorney, Agent, or Firm* — Young & Thompson

(57) ABSTRACT

Provided are a backlight unit and a liquid crystal display device. The backlight unit includes: one or plural LED light sources including N-colored LEDs; a photo-detecting section which measures light intensities of red, green and blue colors of received light and outputs corresponding signals; a driver section including N LED-drivers; and a control section including a drive-condition calculating section and a memory. The drive-condition calculating section calculates control signals for three colors among the N colors, on the basis of information stored in the memory and the signals outputted by the photo-detecting section, makes a pair of each remaining color and one of the three colors, outputs the control signals for three colors to the corresponding three LED drivers, and outputs a control signal determined by using the control signal for a color paired with each remaining color to the LED driver for the each remaining color.

9 Claims, 9 Drawing Sheets

(51) Int. Cl.
*H05B 33/08* (2006.01)
*G09G 3/34* (2006.01)

(52) U.S. Cl.
CPC ............... *H05B 33/0869* (2013.01); *G02F 2001/133612* (2013.01); *G09G 2320/064* (2013.01); *G09G 2320/0646* (2013.01); *G09G 2330/021* (2013.01)

(58) Field of Classification Search
CPC .. G02F 1/133609; G02F 2001/133612; G09G 3/3406; G09G 2360/14–142; G09G 2360/145–148; G09G 3/3413; G09G 2320/021; G09G 2320/064; G09G 2320/0646; G09G 2330/021; H05B 33/0848; H05B 33/0869

USPC ............................................ 345/102; 349/69
See application file for complete search history.

(56) References Cited

U.S. PATENT DOCUMENTS

| | | | |
|---|---|---|---|
| 2008/0068859 | A1 | 3/2008 | Ng et al. |
| 2009/0033613 | A1* | 2/2009 | Butterworth ...... G02F 1/133603 345/102 |
| 2010/0085338 | A1* | 4/2010 | Miguchi ........... G02F 1/133609 345/207 |
| 2010/0253711 | A1 | 10/2010 | Muroi |
| 2011/0122176 | A1* | 5/2011 | Numao ................ G09G 3/3607 345/690 |
| 2014/0035465 | A1* | 2/2014 | Raj .................... H05B 33/0869 315/151 |

FOREIGN PATENT DOCUMENTS

| | | |
|---|---|---|
| JP | 2007-141834 | 6/2007 |
| JP | 2007-532949 | 11/2007 |
| JP | 2011-054576 | 3/2011 |
| JP | 2012-123298 | 6/2012 |
| WO | 2005101807 | 10/2005 |
| WO | 2009110129 | 9/2009 |

* cited by examiner

BACKLIGHT UNIT AND LIQUID CRYSTAL DISPLAY DEVICE

TECHNICAL FIELD

The present invention relates to a backlight unit and a liquid crystal display device. In particular, the present invention relates to a backlight unit using multiple color LEDs (Light Emitting Diodes), and a liquid crystal display device employing the backlight unit.

BACKGROUND

In comparison with a fluorescent tube (including a hot cathode-ray tube and a cold cathode-ray tube), a LED light source is characterized by its reduced environmental burden because it is free from mercury, and is characterized by its excellent color reproducibility, excellent responsibility, wider controllable range of luminance, and longer life. Because of these characteristics, liquid crystal display devices, which are mainly small in size, employ such LED light sources for a backlight and are coming into wide use. In recent years, large-sized liquid crystal display devices also employ such LED light sources as disclosed, for example, in Japanese Unexamined Patent Application Publication No. 2007-532949 (as Japanese translation of PCT International Publication No. WO2005/101807), Japanese Unexamined Patent Application Publications (JP-A) Nos. 2007-123153 and 2004-29141, and PCT International Publication No. WO2009/110129.

Light emitting diodes (LEDs), so-called "cold light sources", belong among semiconductor devices and use a light-emitting phenomenon based on a combination of an electrode and a hole. Therefore, most of LEDs are composed of semiconductor having a band gap corresponding to wavelengths of visible light (for example, inorganic materials including GaN as the base material). Further, organic light-emitting diodes called OLEDs are now being researched and developed, and a part of them has already been put to practical use. There are LEDs with various colors, which differ from conventional fluorescent tubes. For example, not only white LEDs (White Light Emitting Diodes or W-LEDs) but also LEDs adjusted to emit light in any one of various colors, such as red, green, blue and yellow, have been on the market so as to meet various kinds of demands.

LED light sources have small aging-deterioration coming from the use environment and can emit bright light over a long period of time, but have a drawback that their optical properties (that is, the chromaticity of emitted light) fluctuate greatly over a long period of time. Further, single-color LEDs, such as red (R), green (G) and blue (B) LEDs, generally have less light-emission efficiency than that of white LEDs (W-LEDs). To obtain white light of the same luminance, a use of a white LED can reduce power consumption in comparison with a use of a mixture of light in red (R), green (G) and blue (B) emitted by single-color LEDs. Therefore, most liquid crystal display device uses W-LEDs.

However, LED light sources, especially white LEDs, significantly change in color after a long time use, which is a great problem for liquid crystal display devices using LED light sources in a backlight. On the other hand, with increase of the life of various products, liquid crystal display devices are also expected to maintain their properties for a long time in the market (especially in the industrial field). In other words, liquid crystal display devices are expected to have a conventional structure in which a liquid crystal display panel with a simple RGB-pixel structure and further to maintain both of decreased power consumption and high color-reproducibility for a long time, not only at the beginning of use.

In view of such a background, there have been proposed various technologies about liquid crystal display devices. For example, JP-A No. 2007-532949 discloses a technology to realize reduced power consumption of a liquid crystal display device, that is, a structure and a method to use RGBW color filters (also referred to as CFs) in a liquid crystal display panel to have a greater light transmittance in comparison with a liquid crystal display using RGB color filters. However, in the disclosed structure, the liquid crystal display panel transmits white light (W) additionally to light in R, G and B, which causes a problem that the color reproducibility greatly deteriorates. Further, the disclosed technology needs not only a great change of the structure of the liquid crystal display panel (especially, in the pixel structure) but also additional components such as a drive circuit and a conversion circuit for white light, which makes the system complicated and increases the number of components. Accordingly, this structure further makes a problem about an increase of the cost.

JP-A No. 2007-123153 discloses the following liquid crystal display device. The liquid crystal display device achieves high color-reproducibility without modifying a liquid crystal display panel, by using general RGB color filters, three color (red, green and blue) LED light sources, and a feedback section including a color sensor. JP-A No. 2004-29141 also discloses a liquid crystal display device using three color (red, green and blue) light emitting diodes. The liquid crystal display device automatically adjusts the white balance and luminance by using a current-adjustment control circuit and a data-correction control circuit which corrects data of the light quantity obtained from photodetectors that detects red light, green light and blue light.

By employing those technologies, liquid crystal display devices can maintain the high color-reproducibility for a long time. However, LEDs each independently emitting red light, green light and blue light form white light with less light-emission efficiency in comparison with a case that white light is formed with only white LEDs (W-LEDs), and it causes a problem about an increase of the power consumption. Further, if the LEDs deteriorate gradually during a long time use, such situation needs an increase of the quantity of electric current for the LEDs in order to maintain the constant luminance. It results in an increased power consumption, which is a problem.

WO 2009/110129 discloses a liquid crystal display device employing a RGB liquid crystal display panel and a backlight using four color light sources (for example, RGBW light sources). The disclosed technology of the document can provide a high color-reproducibility by conducting a proper control separately on the four color light sources in the backlight, but does not conduct feedback processing using color sensors. The disclosed technology uses backlight data for four colors to be target values. The backlight data is used for calculating luminance values of light in RGB colors for the light source with each color, on the basis of tristimulus values calculated by subtracting the tristimulus values (arbitrary luminance values relative to the maximum gradation level) for the fourth color from target tristimulus values. WO 2009/110129 does not disclose any countermeasure for fluctuation of the light intensity of the four color LEDs in the backlight and deterioration of the LEDs both of which can be caused after a long time use. In other words, it is obvious that the color reproducibility of such a structure can greatly deteriorate after a long time use.

Further, since general input image signals are composed of signals of three (RGB) color-components, the technology disclosed in WO 2009/110129, which uses light sources consisting of four color LEDs in the backlight, needs a calculation circuit for converting the RGB signals into four-color-based signals. Such a calculation circuit consumes much power and harms to achieve the reducer power consumption.

The present invention seeks to solve the problems.

SUMMARY

In view of the above-described problems, there are provided illustrative backlight units and liquid crystal display devices each equipped with the backlight unit, which can maintain, on driving a RGBW-type backlight, both of reduced power consumption and high color-reproducibility for a long time without employing a special additional circuit.

A backlight unit according to one aspect of the present invention comprises one or a plurality of LED light sources each including LEDs with N colors each emitting light in one of the N colors, where N is an integer of four or more. The backlight unit further comprises a photo-detecting section which measures light intensities of red, green and blue colors out of received light emitted from the one or plurality of LED light sources, and outputs signals corresponding to the light intensities. The backlight unit further comprises a driver section including N LED-drivers for driving the LEDs with the N colors, respectively; and a control section including a drive-condition calculating section and a memory, The drive-condition calculating section calculates control signals for three colors among the N colors, on a basis of information stored in the memory in advance and of the signals outputted by the photo-detecting section and corresponding to the light intensities of the red, green and blue colors. The drive-condition calculating section makes a pair of each remaining color and any one of the three colors, where the remaining color or colors are defined by excluding the three colors from the N colors. The drive-condition calculating section outputs, to the three LED drivers for driving the LEDs with the three color, the control signals for three colors, respectively; and outputs, to the LED driver for driving the LED with each remaining color, a control signal determined by using the control signal for a color paired with the each remaining color.

A backlight unit according to another aspect of the present invention comprises one or a plurality of LED light sources each including LEDs with four colors each emitting light in one of the four colors, where the four colors includes white. The backlight unit further comprises a photo-detecting section which measures light intensities of red, green and blue colors out of light emitted from the one or plurality of LED light sources, and outputs signals corresponding to the light intensities. The backlight unit further comprises a driver section including four LED-drivers for driving the LEDs with the four colors, respectively; and a control section including a drive-condition calculating section and a memory. The drive-condition calculating section calculates control signals for three colors defined by excluding the white from the four colors, on a basis of information stored in the memory in advance and of the signals outputted by the photo-detecting section and corresponding to the light intensities of the red, green and blue colors. The drive-condition calculating section outputs the control signals for the three colors to the three LED drivers for driving the LEDs with the three colors, respectively; and outputs a fixed control signal to the LED driver for driving the LED with white.

A liquid crystal display device according to one aspect of the present invention comprises any one of the above backlight unit; and a liquid crystal display panel for displaying images using light emitted by the backlight unit, where the liquid crystal display panel includes color filters having transmission peaks at wavelengths corresponding to red, green, and blue, respectively.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Figure 1:
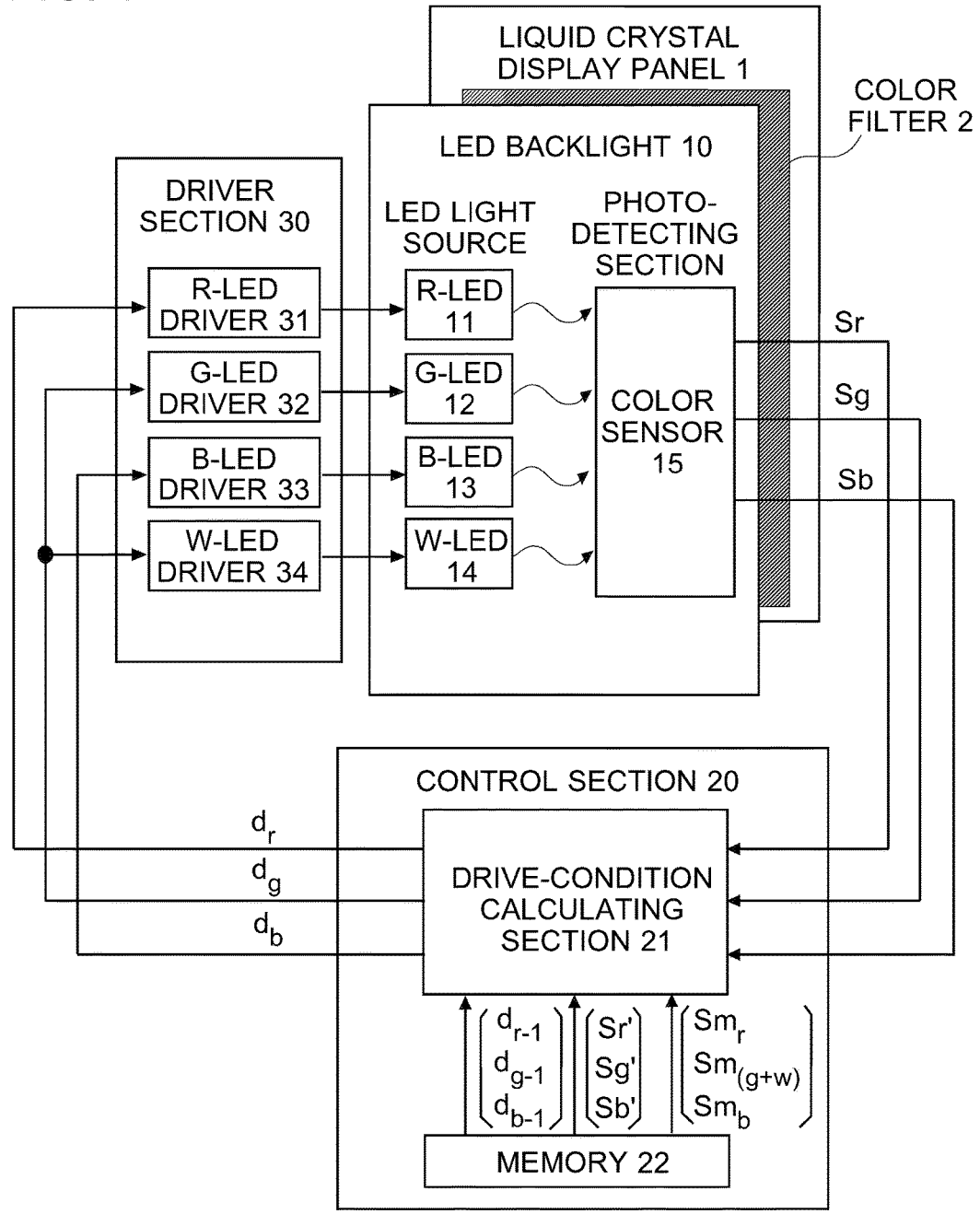
FIG. 1 is a block diagram illustrating a structure of a liquid crystal display device (especially to a backlight unit) according to Example 1.

Illustrative embodiments of backlight units and liquid crystal display devices will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the illustrative backlight units and liquid crystal display devices each equipped with the backlight unit, on driving a RGBW-type backlight, both of reduced power consumption and high color-reproducibility can be maintained for a long time without preparing a special additional circuit, because of the following reason.

With respect to the reason, an illustrative backlight unit comprises one or plural LED light sources each including LEDs with four or more colors; a photo-detecting section which can selectively measures the light intensities of three color components of light emitted from the one or plural LED light sources; a control section that receives signals coming from the photo-detecting section and then controls drive condition of the LEDs with four or more colors; and a driver section that receives control signals coming from the control section and then supplies corresponding electric currents to the LEDs. In the backlight unit, the control section makes at least a pair of colors selected from the four or more colors (such as a pair of white and one selected from RGB, and preferably a pair of white and green), and outputs control signals, which are determined using a common control signal, to be used to control the two-kinds of LEDs with the paired colors. The control signals for controlling the LEDs with the paired colors may be the same as each other, or one control signal for controlling the LEDs with one of the paired colors may be determined by correcting the other control signal with a certain correction factor.

As described in the descriptions of the background, many liquid crystal display devices use white LEDs (W-LEDs) because, to obtain white light of the same luminance, a use of a white LED can reduce power consumption in comparison with a use of a mixture of light in RGB colors emitted by single-color LEDs. However, W-LEDs have a problem that the color significantly changes during a long time use. On the other hand, with an increase of the life of various products, liquid crystal display devices are also expected to maintain their properties for a long time. In other words, liquid crystal display devices are expected to have a conventional structure including a liquid crystal display panel with a simple RGB-pixel structure and further maintain both of decreased power consumption and high color-reproducibility not only at the beginning of use but also for a long time.

In view of that, an illustrative LED backlight unit as one embodiment of the present invention includes one or plural LED light sources each composed of four or more kinds of LEDs with different four or more colors; a photo-detecting section that measures the peak intensity of each of R (red), G (green) and B (blue) of light emitted from the LED light sources to output corresponding signals; a control section that receives the signals outputted by the photo-detecting section and controls drive conditions of the LEDs with respective colors; and a driver section that receives control signals outputted by the control section and supplies corresponding electric currents to the LEDs with respective colors. In the backlight unit, common control signals are used to control two kinds of LEDs with different colors.

In such a device, with respect to the two kinds of LEDs to be controlled by the control signals defined in a common manner, the light emission properties such as tristimulus values of the two kinds of LEDs are added up together, and the two kinds of LEDs are handled as one kind of LEDs to emit light under the same drive condition. That is, making a pair of two kinds of LEDs with different colors and subjecting these LEDs the same control realizes a feedback control of LEDs without increasing its calculation amount even if LEDs with four or more colors are the control targets. As a result, a liquid crystal display device employing the backlight unit can maintain both of decreased power consumption and high color-reproducibility for a long time, not only at the beginning of use, while employing a conventional structure in which a liquid crystal display panel with a simple RGB-pixel structure.

EXAMPLES

Example 1

Figure 2:
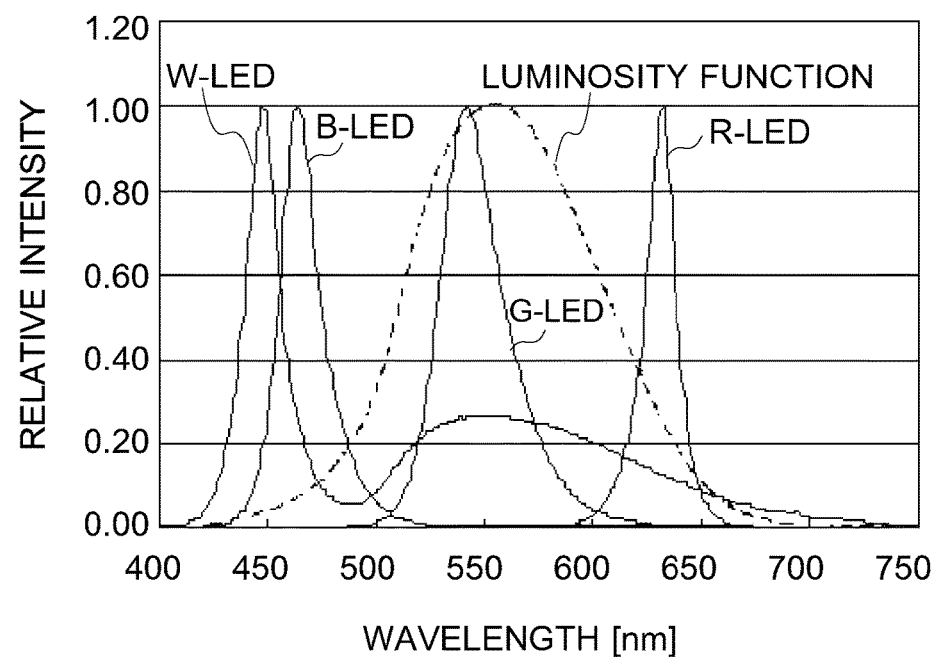
FIG. 2 is a graph illustrating the relationship of spectrums of a R-LED, G-LED, B-LED and W-LED, and a luminosity function curve.
Figure 3:
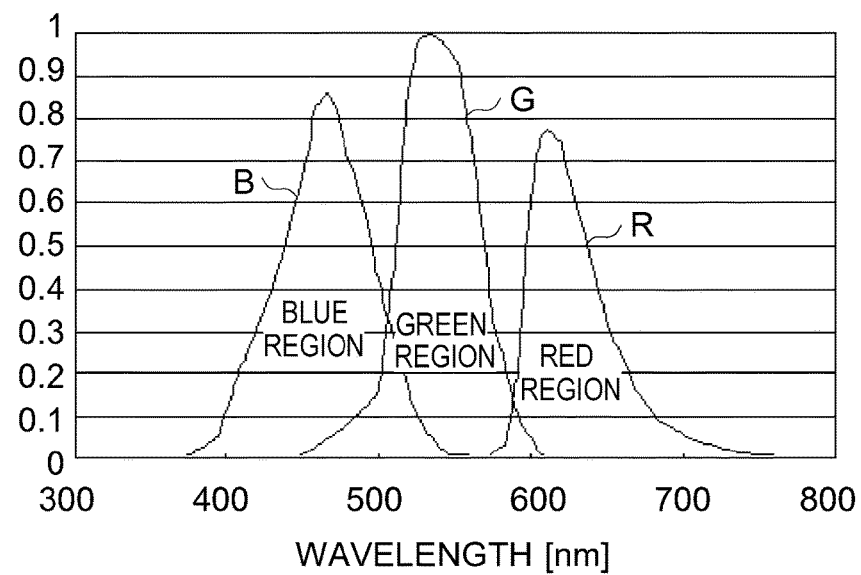
FIG. 3 is a graph illustrating an example of spectral characteristics of a RGB color sensor.
Figure 4:
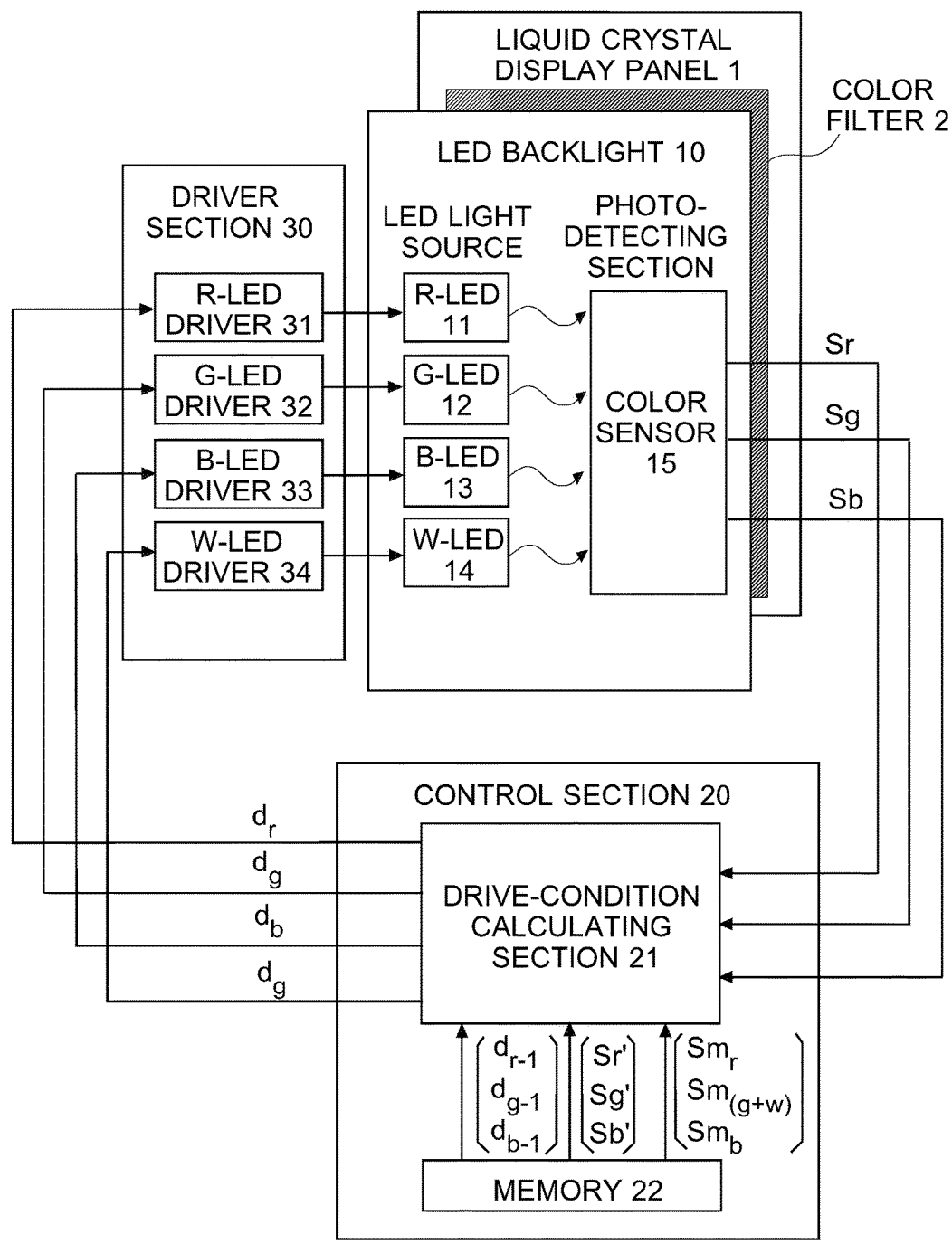
FIG. 4 a block diagram illustrating a modified example of the structure of the liquid crystal display device (especially to the backlight unit) according to Example 1.

Hereafter, in order to describe the above-described embodiments in detail, there will be given a description of a backlight unit and a liquid crystal display device equipped with the backlight unit according to Example 1 with reference to FIGS. 1 to 4. Each of FIG. 1 and FIG. 4 is a block diagram illustrating a structure of a liquid crystal display device (especially to a backlight unit) of the present example. FIG. 2 is a graph illustrating the relationship of spectrums of a R-LED, G-LED, B-LED and W-LED, and a luminosity function curve. FIG. 3 is a graph illustrating an example of spectral characteristics of a RGB-color sensor.

As illustrated in FIG. 1, a liquid crystal display device of the present example is composed of liquid crystal display panel 1, and a backlight unit including a sensor-based feedback control system. The backlight unit is composed of LED backlight 10, control section 20, and driver section 30.

Liquid crystal display panel 1 is composed of two substrates and liquid crystal put between the substrates. One of the substrates includes switching elements, such as thin film transistors (TFTs), formed thereon. The other includes color filters and a black matrix thereon, wherein the color filters have transmission peaks at wavelengths corresponding to red, green, and blue, respectively. With those components, liquid crystal display panel 1 displays images by controlling the transmittance of back light emitted from LED backlight 10. It should be noted that the structure of the liquid crystal display device 1; the type of the liquid crystal in the liquid crystal display device 1; the construction, arrangement, and connecting mode of a drive circuit for controlling the liquid crystal display device 1; and the structure and shape of the casing which holds and fixes components therein are not limited specifically.

LED backlight 10 is a direct-type LED backlight which includes LED light sources arrayed two-dimensionally on the back surface of liquid crystal display panel 1. The LED backlight 10 includes LED light sources each composed of four color LEDs, which are plural sets (clusters) of R-LED 11, G-LED 12, B-LED 13, and W-LED 14, arranged on the casing of the LED backlight 10. FIG. 1 schematically illustrates one of clusters each composed of the four kinds of LEDs. LED backlight 10 further includes a photo-detecting section (RGB color sensor 15) arranged corresponding to the four kinds of LEDs. The RGB sensor 15 is composed of sensors for three (RGB) colors. The RGB sensor 15 selectively measures the intensity of light in each color component emitted from the four kinds of LEDs by using RGB color filters and sends corresponding signals to control section 20 (drive-condition calculating section 21).

Control section 20 is composed of drive-condition calculating section 21 and memory 22 which are arranged at the inside, back surface or side surface of the casing of LED backlight 10 or arranged at a separated position from LED backlight 10. Receiving signals outputted by the RGB color sensor 15, the drive-condition calculating section 21 calculates drive conditions to make the LEDs exhibit a target luminance and a target chromaticity, by calculation processing with referring to control information stored in memory 22 in advance. Then, the drive-condition calculating section 21 outputs corresponding control signals to driver section 30.

Driver section 30 is composed of four LED drivers of R-LED driver 31, G-LED driver 32, B-LED driver 33, and W-LED driver 34 which are arranged at the inside, back surface or side surface of the casing of LED backlight 10 or arranged at a separated position from LED backlight 10. The LED drivers receive controls signals (for example, PWM signals) outputted by control section 20 (drive-condition calculating section 21), and control the intensity of light of the corresponding kinds of LEDs by the PWM (Pulse Width Modulation) method. In the present example, W-LED 14 and G-LED 12 are controlled with common control signals, as illustrated in FIG. 1.

Hereinafter, a general idea of the control method of the present example will be described. First, a control method for three kinds of light sources (LEDs) which independently have RGB colors is considered. In a control to adjust the light emission intensity of each kind of the light sources so as to obtain a target luminance and a target chromaticity, the target luminance and the target chromaticity are given by the following expression (1).

$$\begin{bmatrix} X \\ Y \\ Z \end{bmatrix} = \begin{bmatrix} R_x & G_x & B_x \\ R_y & G_y & B_y \\ R_z & G_z & B_z \end{bmatrix} * \begin{bmatrix} r \\ g \\ b \end{bmatrix} \quad (1)$$

In the expression (1), X, Y and Z are CIE 1931 XYZ tristimulus values representing the target luminance and the target chromaticity; $R_X, R_Y, R_Z, G_X, G_Y, G_Z, B_X, B_Y$ and $B_Z$ are tristimulus values as the light emission properties of the light sources with each of RGB colors; and r, g and b are modulation factors to be used for the control of the light intensities of the light sources with respective colors (in this case, a lighting duty of the PWM method). From the expression (1), the lighting duty of the LEDs with each colors for obtaining the target luminance and the target chromaticity, can be calculated as given in the following expression (2).

$$\begin{bmatrix} r \\ g \\ b \end{bmatrix} = \begin{bmatrix} R_x & G_x & B_x \\ R_y & G_y & B_y \\ R_z & G_z & B_z \end{bmatrix}^{-1} * \begin{bmatrix} X \\ Y \\ Z \end{bmatrix} \quad (2)$$

Next, a control method for four kinds of light sources (LEDs), which includes a light source with another color (such as white) additionally to the RGB light sources is considered. In the control method, handling all the light sources with four colors as the control targets, increases the number of variables in the calculation and one unique solution is hardly obtained, which results in an increase of the calculation amount and calculation complexity. Such a problem becomes more significantly if such control is conducted on light sources in plural areas separately. On the other hand, in a case of handling the light sources with just three colors as the control targets, the light sources with the remaining color are not controlled and continue to be driven at the initial drive condition. Therefore, chromaticity adjustment of the light sources using such a control for a long period in time increases a load of light sources as the control targets, which arises fears of a deterioration of the product life which will be fixed in the end and of an excessive increase of power consumption. In view of that, the present example uses light sources with all the four colors as the control targets to conduct the control based on the following expression (3).

$$\begin{bmatrix} r \\ g \\ b \end{bmatrix} = \begin{bmatrix} R_x & G_x + W_x & B_x \\ R_y & G_y + W_y & B_y \\ R_z & G_z + W_z & B_z \end{bmatrix}^{-1} * \begin{bmatrix} X \\ Y \\ Z \end{bmatrix} \quad (3)$$

In the expression (3), $W_X, W_Y, W_Z$ are tristimulus values as the light emission properties of the W-LED. If the tristimulus values of the W-LED are handled similarly to those for LEDs with RGB colors, variables of the calculation increase and one unique solution of the calculation cannot be obtained. In view of that, as given in the expression (3), the tristimulus values of the G-LED and the tristimulus values of the W-LED are added together, the G-LED and W-LED are assumed as one and the same kind of LEDs which emit light under the same drive conditions, and the modulation factor g (the lighting duty) given by the expression (3) is used also for a control of the W-LED.

In other words, a common control is conducted on the G-LED and W-LED. The reason will be given below. As illustrated in FIG. 2, the wavelengths of light of the G-LED range widely within the sensitivity of human eyes (the luminosity function). Therefore, for representing white by a mixture of three colors of RGB, a G-LEDs needs to emit the greater quantity of light than any other kinds of LEDs. On the other hand, the W-LED has higher light-emission efficiency than the G-LED. In view of them, the W-LED 14 and G-LED 12, which greatly contribute to achieving the target luminance, are controlled with a common control signal, which can efficiency control an adjustment about luminance and chromaticity of the backlight unit.

As described above, by conducting a common control on the G-LED and W-LED, a one unique solution of the calculation can be obtained and the W-LED can be controlled without causing an increase of the calculation amount and calculation complexity both due to an increased number of control targets. As a result, W-LED, which have higher light-emission efficiency, can operate with good efficiency for a long period in time, which minimizes the load of LEDs light sources with RGB colors. It results in a reduction of the excess power consumption and the elongated product life, which will be fixed in the end, of the backlight unit under the continuous control including chromaticity adjustment for a long time.

On the basis of the above-describe general idea, concrete descriptions about the control of the LED backlight 10 of the present example will be provided below.

LED backlight 10 includes LED light sources each composed of R-LED 11, G-LED 12, B-LED 13, and W-LED 14. These LED light sources may be provided as any one of various structures, such as modules each composed of four color LED chips, a combination of four color LED modules, and plural sets of a three-in-one LED module with RGB colors and a single-color LED module being a W-LED. In the present example, it is assumed that LED light sources forms the structure as plural sets of a RGB three-in-one LED module and a single-color LED module being a W-LED. As described above, the LED light sources are provided as groups (clusters) of four color LEDs and the groups of four color LEDs are arranged on the bottom surface of LED backlight 10. The LED backlight 10 is divided into plural control areas so that plural clusters of four color LEDs in each control area can be driven and controlled separately from those in the other control areas.

RGB color sensor 15 is provided for selectively measures light-emission properties of the LED light sources by using RGB color filters which have been arranged thereon in advance, and has spectral characteristics shown in FIG. 3, for example. In LED backlight 10, plural RGB color sensors 15 are arranged on the surface where the LED light sources are fixed, where the number of the RGB color sensors 15 is equal to or less than the number of control areas. In the present example, it is assumed that one RGB color sensor 15 is prepared per one or plural control areas, and each RGB color sensor 15 is located in the middle of the corresponding one or plural control areas. The location of each RGB color sensor 15 may be determined arbitrarily as far as each RGB color sensor 15 can measure light coming from the LED clusters in the corresponding one or plural control areas. Each RGB color sensor 15 measures light intensities of RGB colors of light emitted by the LED light sources and sends corresponding output signals Sr, Sg, and Sb to control section 20.

Control section 20 receives from each RGB color sensor the signals indicating the light emitting condition of the corresponding control area, determines a difference from the target luminance and the target chromaticity, and executes a calculation for correcting drive of LEDs in each control area on the basis of the difference. Specifically, memory 22 stores in advance target values Sr', Sg' and Sb' of output signals of RGB color sensors 15, where the target values correspond to the target luminance and the target chromaticity. Drive-condition calculating section 21 calculates the respective differences between the target values Sr', Sg', and Sb' and the signals Sr, Sg, and Sb received from each RGB color sensor 15. The calculated differences correspond to X, Y, and Z in the expression (1) and are used as target values of the following calculation.

Drive-condition calculating section 21 calculates correction quantities of the LED drive by using the differences and values of $Smr_x$, $Smr_y$, $Smr_z$, $Smg_x$, $Smg_y$, $Smg_z$, $Smb_x$, $Smb_y$, $Smb_z$, $Smw_x$, $Smw_y$, and $Smw_z$ which are output values of the color sensor 15 as the light emission property of the LEDs with each color and are stored in memory 22. Drive-condition calculating section 21 further calculates corrected drive conditions (lighting duty) $d_r$, $d_g$, and $d_b$ by using the following expression (4).

$$\begin{bmatrix} d_r \\ d_g \\ d_b \end{bmatrix} = \begin{bmatrix} Smr_x & Smg_x + Smw_x & Smb_x \\ Smr_y & Smg_y + Smw_y & Smb_y \\ Smr_z & Smg_z + Smw_z & Smb_z \end{bmatrix}^{-1} * \begin{bmatrix} Sr' - Sr \\ Sg' - Sg \\ Sb' - Sb \end{bmatrix} + \begin{bmatrix} d_{r-1} \\ d_{g-1} \\ d_{b-1} \end{bmatrix} \quad (4)$$

In the expression (4), $d_{r-1}$, $d_{g-1}$, and $d_{b-1}$ are drive conditions (lighting duty) of the preceding (or the most recent) feedback loop. The expression (4) represents a calculation for the LED backlight 10 having just one control area. In the case that there are plural control areas as in the present example, the number of elements of the matrix used in the calculation expression increases by a factor of the number of the control areas. The drive conditions (lighting duty) $d_r$, $d_g$, and $d_b$ calculated by the expression (4) are stored in memory 22 because they will be used in the next feedback loop of the control.

The control method of the present example executes the calculation by adding output values $Smg_x$, $Smg_y$, and $Smg_z$ of color sensor 15 as the light-emission property of G-LEDs 12 and output values $Smw_x$, $Smw_y$, and $Smw_z$ of color sensor 15 as the light-emission properties of W-LEDs 14, respectively. In the calculation, G-LEDs 12 and W-LEDs 14 are assumed as one kind of LEDs which emit light under the same drive condition.

Control section 20 (drive-condition calculating section 21) sends control signals, which are the corrected drive conditions $d_r$, $d_g$, and $d_b$ calculated by the above-described expression (4), to LED drivers for the respective colors in driver section 30, to adjust the drive conditions (lighting duty) of LEDs in LED backlight 10. In this process, control section 20 (drive-condition calculating section 21) sends a control signal which is drive condition $d_g$ calculated for G-LEDs 12, to W-LEDs 14. In other words, W-LEDs 14 and G-LEDs 12 are controlled on the basis of the common control signal. Accordingly, a feedback control can be conducted on four color LEDs, at almost the same calculation amount as a feedback control for three color LEDs.

In the present example, as illustrated in FIG. 1, there are three control signal lines wired from control section 20 (drive-condition calculating section 21) to drive section 30. However, another structure may be employed. As illustrated in FIG. 4, four control signal lines may be prepared so as to be wired to LED drivers for four colors one by one, and a common control signal may be assigned to two of the control signal lines to be connected to the LED drivers for two colors (in FIG. 4, the control signal for G-LED driver 32 and the control signal for W-LED driver 34 are determined as $d_g$).

Further, the present example employs a structure that R, G, B and W LEDs are used as the four color LEDs. However, the combination of the four colors is not limited to them and arbitrary color combination may be used as far as three of the four colors can reproduce at least the color temperature corresponding to the white point on the black-body locus.

Example 2

Figure 5:
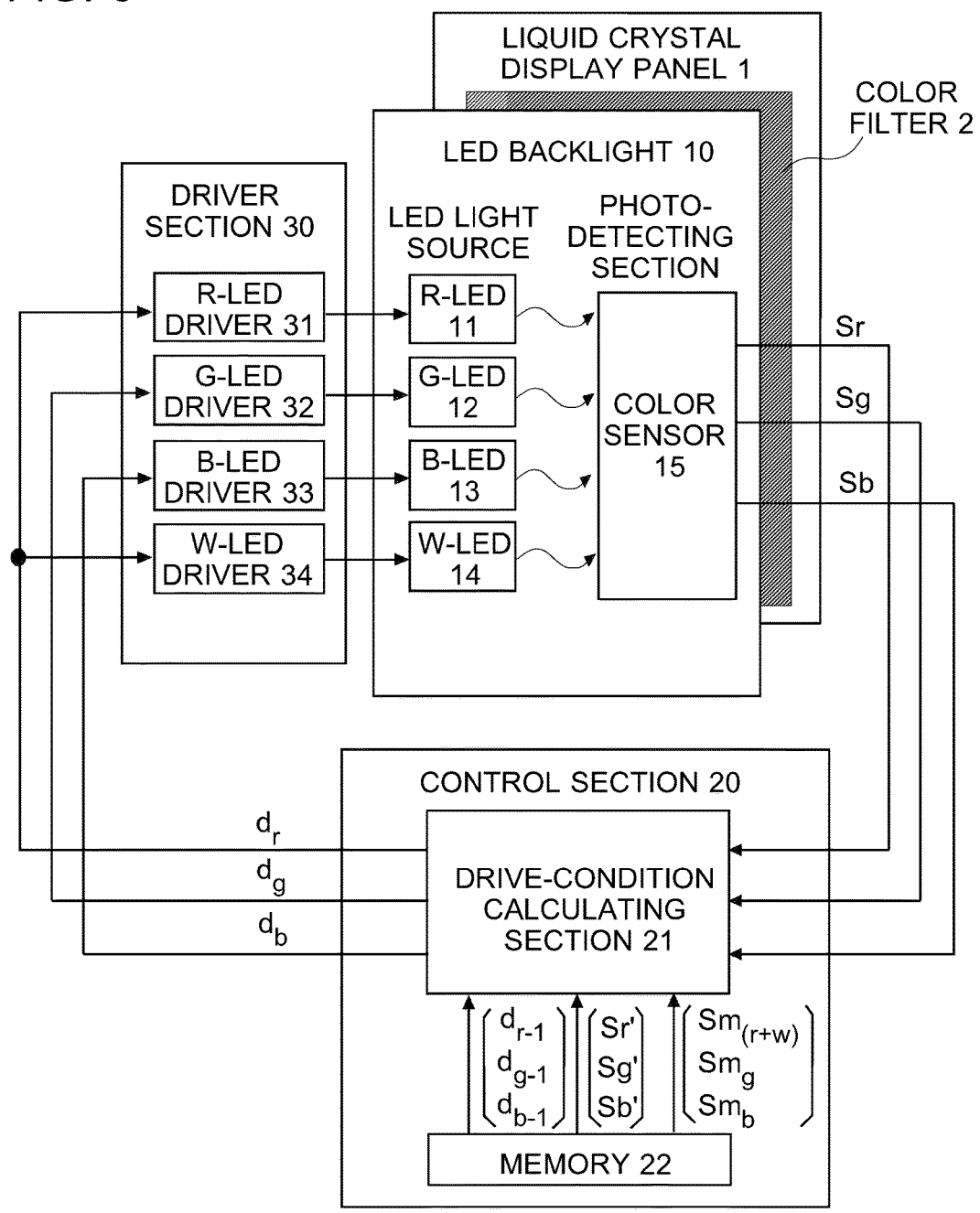
FIG. 5 a block diagram illustrating a structure of a liquid crystal display device (especially to a backlight unit) according to Example 2.
Figure 6:
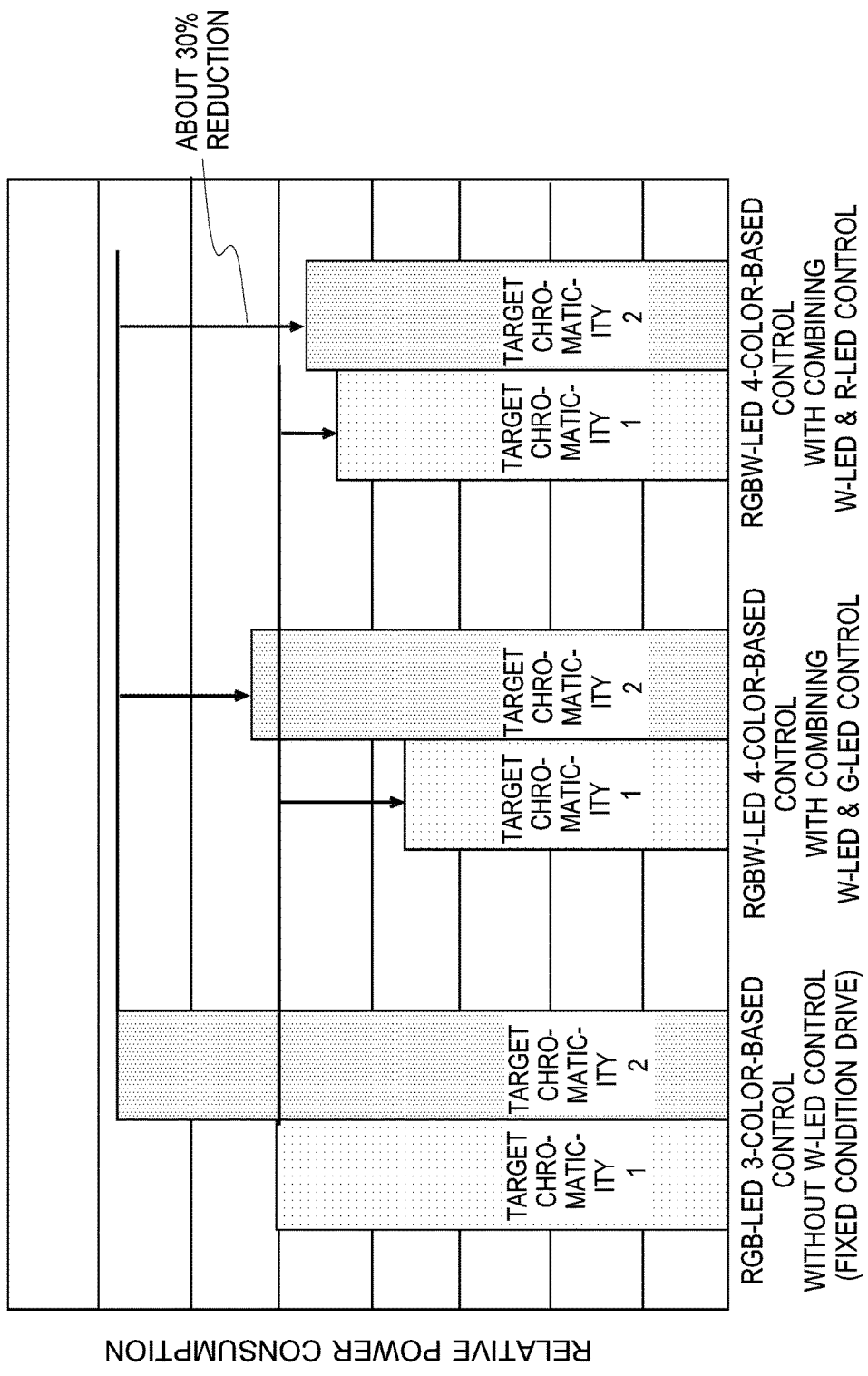
FIG. 6 is a graph illustrating an effect of a reduction of power consumption as a result of a long-term control of the backlight unit according to Examples 1 and 2.

Next, there will be given a description of a backlight unit and a liquid crystal display device equipped with the backlight unit according to Example 2 with reference to FIGS. 5 and 6. FIG. 5 is a block diagram illustrating a structure of a liquid crystal display device (especially to a backlight unit) of the present example. FIG. 6 is a graph illustrating an effect of a reduction of power consumption as a result of a long-term control of the backlight unit according to Examples 1 and 2.

In the above-described Example 1, W-LEDs 14 and G-LEDs 12 are assumed as one kind of LEDs which emit light under the same drive condition. Alternatively, W-LEDs 14 and R-LEDs 11 may be controlled under the assumption that they are one kind of LEDs which emit light under the same drive condition. In this case, the expression (4) of Example 1 can be modified as given in the expression (5).

$$\begin{bmatrix} d_r \\ d_g \\ d_b \end{bmatrix} = \begin{bmatrix} Smr_x + Smw_x & Smg_x & Smb_x \\ Smr_y + Smw_y & Smg_y & Smb_y \\ Smr_z + Smw_z & Smg_z & Smb_z \end{bmatrix}^{-1} * \begin{bmatrix} Sr' - Sr \\ Sg' - Sg \\ Sb' - Sb \end{bmatrix} + \begin{bmatrix} d_{r-1} \\ d_{g-1} \\ d_{b-1} \end{bmatrix} \quad (5)$$

On the basis of the expression (5), the control section 20 sends a control signal, which is the drive condition $d_r$ of R-LEDs 11, to W-LED driver 34, and then controls the W-LEDs 14. In other words, the control signal for W-LEDs 14 and the control signal for R-LEDs 11 are determined by a same one control signal.

Also in the control method of the present example, similarly to the control method of Example 1, a feedback control can be conducted without increasing the calculation amount. That is, a sensor-based feedback control can be conducted on four kinds of LEDs having four different colors with color sensor 15 just for three colors.

A reduction effect of power consumption of the backlight unit according to the Example 1 and Example 2 will be described with reference to FIG. 6. FIG. 6 illustrates the following simulation results of the power consumption obtained after various types of the feedback control using predetermined target chromaticity 1 and target chromaticity 2: simulation results of the power consumption obtained after feedback control was conducted on four color LEDs for a long period of time by using the control method of Example 1 and Example 2 (4-color-based control); and a simulation result of the power consumption obtained after feedback control was conducted also on four color LEDs for a long period of time without controlling W-LEDs 14, that is, W-LEDs 14 were driven under a fixed drive condition and feedback control was conducted on just the remaining R-LEDs 11, G-LEDs 12, and B-LEDs 13 for a long period of time (3-color-based control). As for the simulations using the control methods of the Example 1 and Example 2, the simulations were conducted under two types of control for each of the target chromaticity 1 and the target chromaticity 2. The first control is that, as described in Example 1, the control signal of W-LEDs 14 and the control signal of G-LEDs 12 were common control signals, and the other is that, as described in Example 2, the control signal of W-LEDs 14 and the control signal of R-LEDs 11 were common control signals. The calculation amounts of control conditions of all the three kinds of control in FIG. 6 are almost the same as that of the three-color-based feedback control.

As can be seen from the comparison of calculations of the three kinds of control, the power consumption was reduced by about 30% when a control signal of W-LEDs 14 and a control signal of another kind of LEDs were common signals and a feedback control was conducted on the assumption that it was three-color-based control, as in the control methods for Example 1 and Example 2. For a different target chromaticity, another kind of LEDs with different color may be selected to be controlled together with W-LEDs 14 using common signals, which can realizes effective feedback control for the different target chromaticity for a long period of time.

Figure 7:
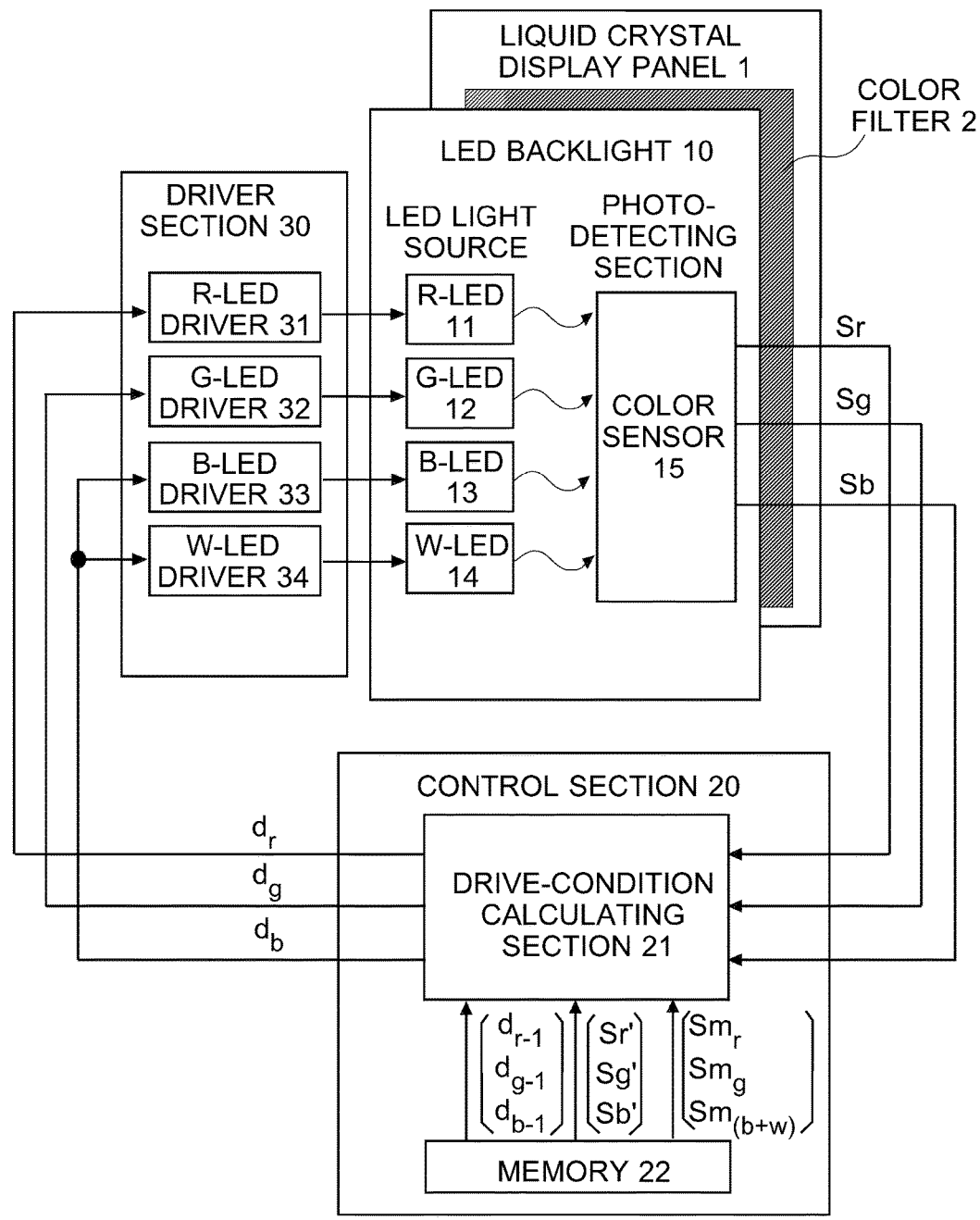
FIG. 7 is a block diagram illustrating a modified example of the structure of the liquid crystal display device (especially to the backlight unit) according to Example 2.

With respect to the LEDs to be driven under the same drive condition as the W-LEDs, LEDs with any color can be selected as such LEDs, as far as the target chromaticity falls in the chromaticity region defined by chromaticity coordinates obtained by the selected LEDs and the chromaticity coordinates obtained by the LEDs with the remaining two colors. For example, when the color temperature of the white point which is displayed to meet a special market-demand is greatly deviated from the blackbody locus, it is optimum that W-LEDs 14 and R-LEDs 11 are controlled by common control signals. Similarly, W-LEDs 14 and R-LEDs 11 can be controlled by common control signals as illustrated in FIG. 7, depending on a demanded target chromaticity.

Example 3

Next, there will be given a description of a backlight unit and a liquid crystal display device equipped with the backlight unit according to the third example.

In the above-described Example 1 and Example 2, the control section 20 made a pair of colors that is W and any one of RGB colors and outputted common control signals for the LEDs with the paired colors. However, such a pair of colors may be selected from any two colors among any colors expect W. As described above, depending on a desired color temperature of the white point, also the pair of colors of the present example can realize efficient chromaticity adjustment for a long period of time. In this case, the pair of colors may be selected arbitrarily as far as they are not white.

Example 4

Next, there will be given a description of a backlight unit and a liquid crystal display device equipped with the backlight unit according to the fourth example.

In Example 1 and Example 2 described above, the control section 20 determined the drive condition of W-LEDs 14 and a drive condition of LEDs with any one of RGB colors to be the same. As in the present example, the control section 20 may, among LEDs with four colors including W-LEDs 14, fix the drive condition of W-LEDs 14 and control the other LEDs with the remaining three colors. Also the structure of the present example can realize a chromaticity adjustment of the four color LEDs to an arbitrary white point by controlling LEDs with three colors defined by excluding white from the four colors, because signals outputted by color sensor 15 includes measurement result of RGB components of light emitted by W-LEDs 14.

Example 5

Figure 8:
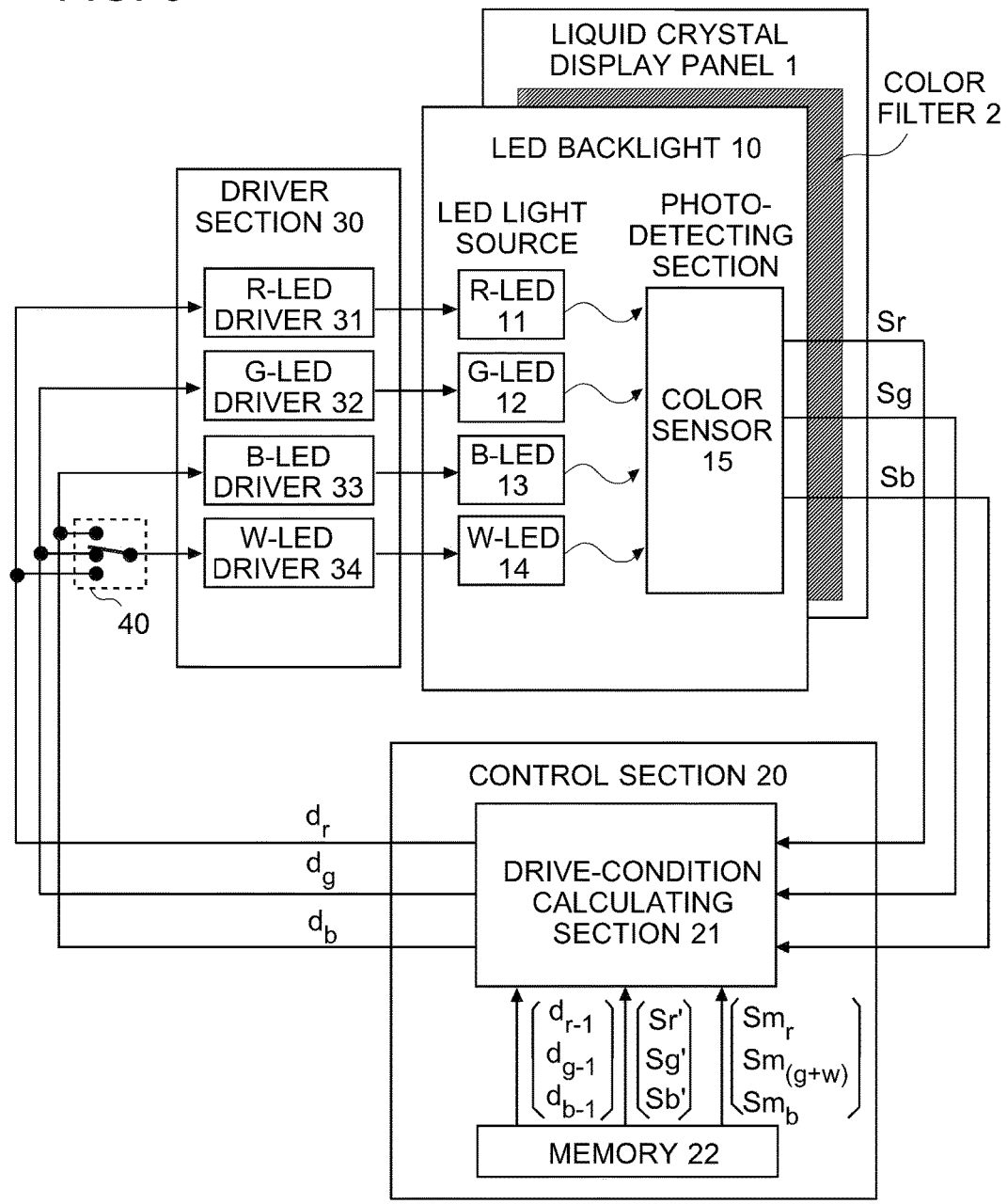
FIG. 8 is a block diagram illustrating a structure of a liquid crystal display device (especially to a backlight unit) according to Example 5.

Next, there will be given a description of a backlight unit and a liquid crystal display device equipped with the backlight unit according to the fifth example with reference to FIG. 8. FIG. 8 is a block diagram illustrating a structure of a liquid crystal display device (especially to a backlight unit) according to the present example.

In Example 1 and Example 2 described above, the control section 20 determined the drive condition of W-LEDs 14 using a drive condition of LEDs with a predetermined color among RGB colors. Alternatively, as illustrated in FIG. 8, the backlight unit may include switch 40, which can be controlled by control section 20, so as to select a control signal to be sent to W-LED driver 34 from the control signals to be sent to LEDs with RGB colors. Since this structure can switch a LED driver to share the control signal with W-LED driver 34, such a structure can easily employ an optimum pair of colors of LEDs depending on the target luminance and the target chromaticity. Therefore, it allows the backlight unit to conduct most efficient control according to its display contents.

Example 6

Figure 9:
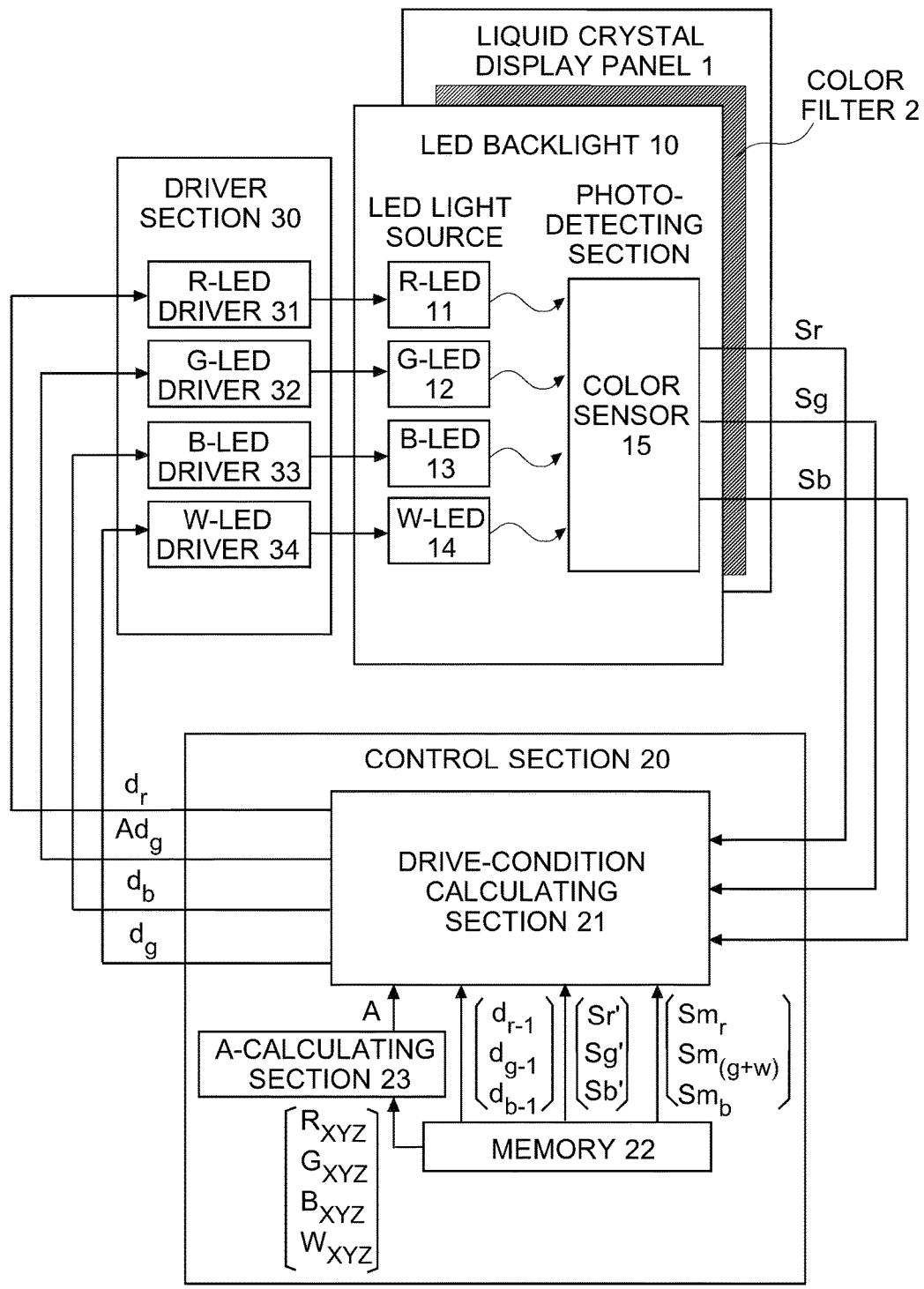
FIG. 9 is a block diagram illustrating a structure of a liquid crystal display device (especially to a backlight unit) according to Example 6.
Figure 10:
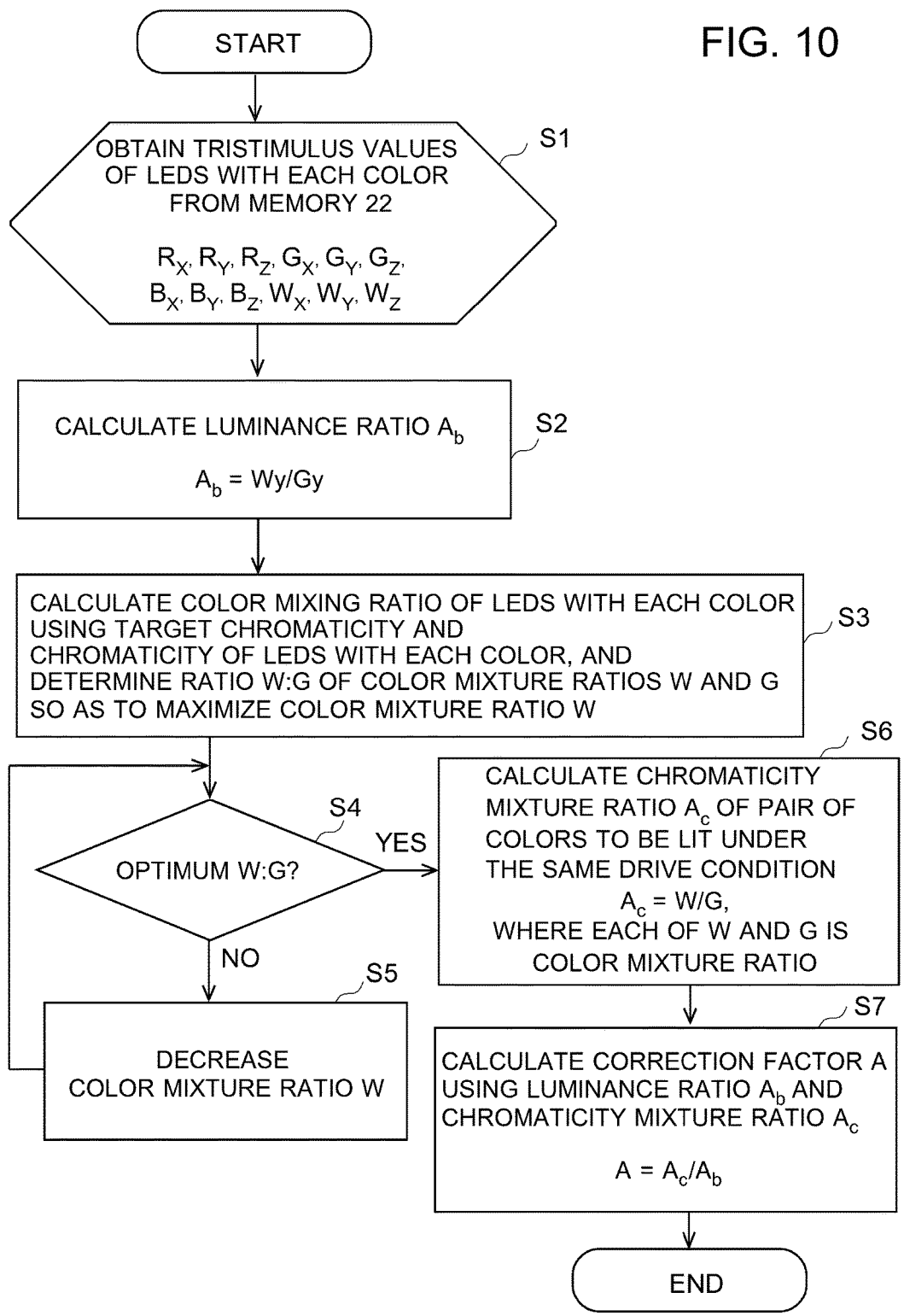
FIG. 10 is a flowchart of processing to calculate correction factor A of Example 6.

Next, there will be given a description of a backlight unit and a liquid crystal display device equipped with the backlight unit according to the sixth example with reference to FIGS. 9 and 10. FIG. 9 is a block diagram illustrating a structure of a liquid crystal display device (especially to a backlight unit) according to the present example. FIG. 10 is a flowchart of processing to calculate correction factor A.

As illustrated in FIG. 9, control section 19 is composed of drive-condition calculating section 21, memory 22, and A-calculating section 23. A-calculating section 23 creates correction factor A using signals obtained from memory 22 and outputs the correction factor A into drive-condition calculating section 21. Drive-condition calculating section 21 uses correction factor A, signals (Sr, Sg, Sb) obtained from color sensor 15, and signals ($d_{r-1}$, $d_{g-1}$, $d_{b-1}$, Sr', Sg', Sb', Smr, Sm(g+w), Smb) obtained from memory 20 and creates signals to be sent to driver section 30. Control section 20 sends four signals to driver section 30. Driver section 30 is composed of four drivers: R-LED driver 31, G-LED driver 32, B-LED driver 33, and W-LED driver 34.

LED backlight 10 includes LED light sources each composed of R-LED 11, G-LED 12, B-LED 13 and W-LED 14.

To simplify the description, a signal for red color (R) is described. Control section 20 supplies created signal $d_r$ to R-LED driver 31 to drive R-LEDs 11 with electric current. Similarly, control section 20 supplies created signal $d_b$ to B-LED driver 33 to drive B-LEDs 13 with electric current. Control section 20 supplies created signal $d_g$ to W-LED driver 34 to drive W-LEDs 11 with electric current. Control section 20 calculates signal $Ad_g$ by multiplying signal $d_g$ with correction factor A created by A-calculating section 23, and supplies signal $Ad_g$ to G-LED driver 32 to drive G-LEDs 12 with electric current. It means that the signal to be supplied to G-LED driver 32 is A times as greater as the signal to be supplied to W-LED driver 34. The control employing the correction factor A produces an effect that the initial power consumption can be reduced. Further, use of the backlight unit using such a control for a long period of time, which exceeds several tens of thousands hours, produces an effect that both of the power consumption and fluctuation of the chromaticity region can be reduced even in the last period of the use, when the LED light sources have deteriorated.

The flowchart of FIG. 10 illustrates the way to calculate correction factor A in control section 20. The sensor-based feedback control of all the above-described examples needs to obtain the light emission properties of LEDs with each color on the basis of tristimulus values, and such calculation is essential for the operations of the sensor-based feedback control. As described above, in the present example, the correction factor A is calculated on the basis of light emission properties, such as tristimulus values, of LEDs with each color.

In step S1, the driver section 30 drives LEDs with each color by using an arbitrary current value, and color sensor 15 measures tristimulus values ($R_X$, $R_Y$, $R_Z$, $G_X$, $G_Y$, $G_Z$, $B_X$, $B_Y$, $B_Z$) of LEDs with respective colors. It is preferable that each driving condition (the lighting duty) at this time is 100%. The measurement result is stored into memory 22.

In step S2, by using the measurement values, the A-calculating section 23 calculates luminance ratio $A_b$ of luminance values of colors which correspond to LEDs to be driven under the same drive condition. Since the signal for G-LEDs 12 is corrected by the correction factor A in the present example, the luminance ratio is given as $A_b = W_Y / G_Y$.

In step S3, by using the chromaticity to be used as target value and the chromaticity of LEDs with each color obtained by using the measurement values obtained in step S1, the A-calculating section 23 calculates the color mixing ratio of each color relative to the target value. At this time, the A-calculating section 23 determines the ratio W:G of the color mixing ratios of a pair of colors of LEDs, which are to be operated to emit light using the same drive condition (in the present example, W-LEDs 14 and G-LEDs 12), so as to maximize the color mixing ratio of W.

In step S4, the A-calculating section 23 determines whether the ratio W:G of color mixing ratios is optimum.

In step S5, on determining that the ratio W:G of the color mixing ratios is not optimum, the A-calculating section 23 decreases the color mixing ratio of W of the ratio W:G.

In step S6, on determining that the ratio W:G of the color mixing ratios is optimum, the A-calculating section 23 calculates the chromaticity mixing ratio $A_c$ of a pair of colors which is used for LEDs to be operated to emit light under the same drive condition. Since the drive condition of G-LEDs 12 is corrected by the correction factor A in the present example, the chromaticity mixing ratio $A_c$ is given as $A_c = W/G$, where each of W and G is the color mixing ratio.

In step S7, the A-calculating section 23 calculates the correction factor A by using the luminance ratio $A_b$ and the chromaticity mixing ratio $A_c$, as given by $A = A_c / A_b$.

The drive-condition calculating section 21 corrects the drive condition $d_g$ into $Ad_g$ by using the correction factor A obtained by the above-described flow.

Next, operations of the sensor-based feedback control using the correction factor A will be described. The drive-condition calculating section 21 calculates the LED drive conditions for the sensor-based feedback control by using the above-described expression (4). Since the signal for G-LEDs is corrected with the correction factor A in the present example, the expression (4) can be modified as given by the following expression (6).

$$\begin{bmatrix} d_r \\ d_g \\ d_b \end{bmatrix} = \begin{bmatrix} Smr_x & A*Smg_x + Smw_x & Smb_x \\ Smr_y & A*Smg_y + Smw_y & Smb_y \\ Smr_z & A*Smg_z + Smw_z & Smb_z \end{bmatrix}^{-1} * \begin{bmatrix} Sr' - Sr \\ Sg' - Sg \\ Sb' - Sb \end{bmatrix} + \begin{bmatrix} d_{r-1} \\ d_{g-1} \\ d_{b-1} \end{bmatrix} \quad (6)$$

In the present example, the control section 20 includes the A-calculating section 23 to calculate the correction factor A. The A-calculation control section 23 calculates the correction factor A according to the flowchart of FIG. 10 and sends the correction factor A to drive-condition calculating section 21. Information of tristimulus values of LEDs with each color to be sent to the A-calculating section 23 have been stored in memory 22.

The control section 20 (drive-condition calculating section 21) sends control signals to LED drivers for corresponding colors in driver section 30, to control the drive conditions (the lighting duty) of respective kinds of LEDs in LED backlight 10, where the control signals are the corrected drive conditions $d_r$, $d_g$, and $d_b$ calculated according to the expression (6). In this operation, the control section 20 (drive-condition calculating section 21) sends a control signal, which is drive condition $d_g$ for G-LED 12, to G-LED driver 32. In other words, the control section 20 performs control processing by using common control signals for controlling W-LEDs 14 and G-LEDs 12. Then, the control section 20 sends drive condition $Ad_g$ calculated by multiplying $d_g$ with correction factor A in the expression (6) to G-LED drivers 32. With such operations, a use of the correction factor allows the control section to achieve feedback control of four color LEDs due to by doing the same extent of calculation to that of the control of three color LEDs.

Though FIG. 9 illustrates the structure of the backlight unit that the control section 20 includes A-calculating section 23, the backlight unit may include a structure such that the correction factor A calculated in an external unit have been stored in memory 22 in advance. It should be noted that if the control section 20 includes A-calculating section 23 and tristimulus values of LEDs with each color have been stored in memory 22 in advance, such a structure can freely switches the kind of LEDs to be controlled using the correction factor A.

It should be noted that the present invention is not limited to the above-described embodiments and examples, and the structure and the control method of the backlight unit can be modified as appropriate as long as the gist of the present invention is not deviated. For example, in the above example, correction factor A was multiplied with signal $d_g$ to be supplied to G-LED driver 32, but the backlight unit may employ a similar structure and control in which the correction factor A is multiplied with signal $d_r$ to be supplied to R-LED driver 31 or signal $d_b$ to be supplied to B-LED driver 33.

As another example, the above-described embodiments and examples may similarly employ a control of LEDs with five or more colors, though Examples 1, 2, 3, 5 and 6 employed the control of LEDs with four colors. In case of performing the control of LEDs with five colors, the control section of such a backlight unit may control LEDs with a pair of arbitrary two colors among the LEDs with five colors using common control signals and further control LEDs with another pair of arbitrary two colors among the LEDs with the remaining three colors using another common control signals. With such operations, the control section can control the LEDs with five light colors with the same extent of calculation to that of the control of LEDs with three colors. The following control is generalized from the above described controls. The control section 20 (drive-condition calculating section 21) calculates control signals for arbitrary three colors among N colors (where N is a integer of four or more); makes a pair of each of the remaining "N−3" colors and any one of the three colors; outputs the calculated control signals to the LED drivers that drive LEDs with the three colors, respectively; and outputs to the LED driver which drives LEDs with each of the remaining colors, a control signal determined by using the calculated control signal for the color paired with the remaining color concerned.

Further, in the above examples, descriptions about the control on LED light sources in one control area were given. However, the same type of control may be performed on plural control areas of LED backlight 10, or different types of control may be performed on the plural control areas separately. For example, several types of control described in Examples 1 to 5 may be combined for the plural control areas arbitrarily, such that G-LEDs and W-LEDs may be controlled by using common control signals in the upper half area of LED backlight 10, and R-LEDs and W-LEDs may be controlled by using another common control signals in the lower half area of LED backlight 10.

The invention claimed is:

1. A backlight unit comprising:
   one or a plurality of light emitting diode (LED) light sources each including LEDs with N colors each emitting light in one of the N colors, where N is an integer of four or more;
   a photo-detecting sensor which measures light intensities of red, green, and blue colors out of received light emitted from the one or plurality of LED light sources, and outputs signals corresponding to the light intensities;
   N LED-drivers that drive the LEDs with the N colors, respectively;
   a controller that outputs control signals to the N-LED drivers, respectively;
   a memory that stores
      previously-calculated control signals that are previously calculated by the controller, target values of the signals corresponding to the light intensities of the red, green, and blue colors, respectively, and
      output values of the photo-detecting sensor based on light emission properties of the LEDs with the N colors; and
   control-signal lines configured to transmit the control signals from the controller to the LED drivers, wherein the controller
      calculates differences between the signals output from the photo-detecting sensor and the target values of the signals, referring to the memory,
      combines each of N−3 colors, except three colors out of the N colors, with any one of the three colors individually selected for each of the N−3 colors, and generates output values for the three colors from the output values of the N colors, by adding each of the output values of the N−3 colors to any one of the output values of the three colors respectively combined,
      calculates, based on (i) the differences, (ii) the output values for the three colors, and (iii) the previously-calculated control signals obtained by the controller in a preceding calculation thereof, control signals to be output to the LED driver that drives the LEDs for each of the three colors,
      outputs the control signals calculated for each of the three colors to the respective LED drivers that drive the LEDs of the three colors, and
      outputs the control signals to the LED drivers that drive the LEDs of the N−3 colors, the control signals output to the LED drivers that drive the LEDs of the N−3 colors being the same as the control signals to be output to the LED driver that drives the LEDs of the three colors combined with each of the N−3 colors,
   wherein the control-signal lines are wired to the N LED-drivers one-by-one,
   the controller assigns a corrected control signal to one of the control-signal lines corresponding to the combined color, where the corrected control signal is calculated by correcting the control signal for the combined color with a correction factor, and the correction factor is calculated using output values of the photo-detecting sensor prepared as a light emission property of the LED with each of the N colors, and
   the controller assigns an uncorrected control signal that is uncorrected by the correction factor to another of the control-signal lines corresponding to the combined color.

2. The backlight unit of claim 1, the controller assigns a same control signal to the control-signal lines wired to the LED drivers to drive the LEDs with each remaining color and the combined color.

3. The backlight unit of claim 1, wherein the N colors include white.

4. The backlight unit of claim 3, wherein the controller makes a pair of white and another color among the N colors.

5. The backlight unit of claim 4, wherein the other color is green.

6. The backlight unit of claim 3, wherein the controller makes a pair of colors selected from the N colors except white.

7. The backlight unit of claim 1, further comprising a switch that selects any one of the LED drivers for one of the N colors to be paired with another of the N colors.

8. The backlight unit of claim 1, wherein the control signals are Pulse Width Modulation (PWM) signals for driving the one or plurality of LED light sources by a PWM method.

9. A liquid crystal display device comprising:
   the backlight unit of claim 1; and
   a liquid crystal display panel configured to display images using light emitted by the backlight unit, the liquid crystal display panel including color filters having transmission peaks at wavelengths corresponding to red, green, and blue, respectively.

* * * * *